United States Patent
Briceno et al.

(10) Patent No.: US 11,703,082 B2
(45) Date of Patent: Jul. 18, 2023

(54) MULTI-BALL THRUST BEARING ARRANGEMENT

(71) Applicant: Allison Transmission, Inc., Indianapolis, IN (US)

(72) Inventors: Jorge F. Briceno, Indianapolis, IN (US); Burak A. Gecim, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 17/857,539

(22) Filed: Jul. 5, 2022

(65) Prior Publication Data

US 2022/0397153 A1    Dec. 15, 2022

Related U.S. Application Data

(63) Continuation of application No. 17/117,620, filed on Dec. 10, 2020, now Pat. No. 11,378,121.

(51) Int. Cl.
  *F16C 19/10*    (2006.01)
  *F16C 33/38*    (2006.01)
  *F16C 33/40*    (2006.01)

(52) U.S. Cl.
  CPC .......... *F16C 19/10* (2013.01); *F16C 33/3887* (2013.01); *F16C 33/40* (2013.01)

(58) Field of Classification Search
  CPC .......... F16C 19/10; F16C 19/12; F16C 19/30; F16C 19/305; F16C 19/32; F16C 33/3887; F16C 33/40; F16C 33/425; F16C 33/588
  See application file for complete search history.

(56) References Cited

U.S. PATENT DOCUMENTS

| | | | |
|---|---|---|---|
| 1,340,250 | A | 5/1920 | Pruyn |
| 3,409,338 | A | 11/1968 | Root et al. |
| 4,045,100 | A | 8/1977 | Beauchet |
| 4,077,683 | A | 3/1978 | Bhateja et al. |
| 7,134,794 | B2 | 11/2006 | Obayashi |
| 7,909,515 | B2 | 3/2011 | Takimoto et al. |
| 8,177,438 | B2 | 5/2012 | Waseda |
| 9,581,197 | B2 | 2/2017 | Moratz |
| 2016/0010688 | A1 | 1/2016 | Tate |

FOREIGN PATENT DOCUMENTS

| | | |
|---|---|---|
| DE | 821887 C | 11/1951 |
| DE | 102017124930 A1 * | 4/2019 |
| GB | 276275 A * | 8/1927 |
| GB | 1396234 A | 6/1975 |
| JP | 2012077761 A * | 4/2012 .............. F16C 19/10 |

OTHER PUBLICATIONS

Machine Translation of JP-2012077761-A (Year: 2012).*
Machine Translation of DE-102017124930-A1 (Year: 2019).*

* cited by examiner

*Primary Examiner* — Alan B Waits
(74) *Attorney, Agent, or Firm* — Barnes & Thornburg LLP

(57) ABSTRACT

A thrust bearing has an outer race and an inner race arranged for rotation relative to the outer race about an axis of rotation. Multiple rolling elements are positioned between the inner and outer races. A cage is positioned between the inner and outer races and configured to engage with the rolling elements to align the rolling elements into multiple rows, with the rows circumferentially spaced apart from one another.

16 Claims, 9 Drawing Sheets

MULTI-BALL THRUST BEARING ARRANGEMENT

CROSS-REFERENCE TO RELATED APPLICATION

The present application is a continuation of, and claims priority to, U.S. patent application Ser. No. 17/117,620, entitled "Multi-Ball Thrust Bearing Arrangement" by Briceno et al., now U.S. Pat. No. 11,378,121, which was filed on Dec. 10, 2020 and which claims the benefit of U.S. Provisional Patent Application No. 62/946,043, filed Dec. 10, 2019, the entirety of which is expressly incorporated herein by reference.

TECHNICAL FIELD

The present disclosure relates, generally, to bearings and, more specifically, to thrust bearings for use in a transmission.

BACKGROUND

There are generally two types of thrust bearings available in the market today: ball and cylindrical roller bearings (taper rollers are considered a derivative of cylindrical rollers). Roller bearings tend to have greater load capacity due to the increased contact area than ball bearings, but also have higher frictional loses. Further, the contact area at the ends of the rollers can cause the rollers to "drill" into the bearing structure as the rollers are forced outward with rotation of the bearing. The high rotational speeds experienced in transmissions can compound these negative effects.

For example, a lack of "rolling condition" along the roller's length may lead to frictional losses for roller bearings. A radially elongated cylindrical roller rotates around its self axis, and exhibits orbital motion (at cage speed) around the bearing central axis. The roller's net surface tangential speed is a combination of those two motions, and is not a function of the radial position. For "rolling" condition to be maintained, at each race, net surface tangential speed of the roller must equal to the tangential speed of the race, which is a function of the radial position (increasing as with outward radial distance). Thus, kinematically, a cylindrical roller can never have "rolling condition" along its entire length, except one point, which may cause frictional losses due to roller sliding. The longer the roller, the worse the sliding at other points. Further, roller motion within the clearances around the roller may cause further losses as the rollers tip forward/backward.

SUMMARY

According to one aspect of the present disclosure, a thrust bearing comprises a first race and a second race positioned opposite the first race. The second race is arranged for rotation relative to the first race about an axis of rotation. The thrust bearing further comprises a plurality of rolling elements positioned between the first race and the second race, and a cage positioned between the first race and the second race. The cage is configured to engage with the rolling elements to align the rolling elements into a plurality of rows, the rows circumferentially spaced apart from one another. Each row of rolling elements includes at least two rolling elements. In some embodiments, each row of rolling elements includes at least three rolling elements. In some embodiments, the rolling elements are spherical balls.

In some embodiments, each row of rolling elements extends radially along an axis extending through the axis of rotation. In some embodiments, each row of rolling elements extends linearly along an axis that is offset from the axis of rotation. In some embodiments, the plurality of rows includes a first plurality of rows that each extend linearly along an axis offset to a first side of the axis of rotation and a second plurality of rows that each extend linearly along an axis offset to a second side of the axis of rotation, wherein the second side is opposite the first side.

In some embodiments, the cage includes a body and a plurality of pockets formed into the body. The pockets are configured to receive the rolling elements and engage with the rolling elements to align the rolling elements into the rows. In some embodiments, each pocket defines an opening through the body of the cage that is sized to receive one or more rolling elements. In some embodiments, each pocket receives a single rolling element. In some embodiments, each pocket receives multiple rolling elements.

In some embodiments, wherein the cage and the plurality of rolling elements are positioned between radially extending face walls of the first race and the second race, and wherein the rolling elements are configured to engage with interior surfaces of the face walls to allow relative rotation of the first race and the second race. In some embodiments, the interior surfaces of the face walls are grooved to receive the rolling elements. In some embodiments, each of the first race and the second race comprises a thrust washer, wherein each thrust washer includes a face wall and an interior surface. In some embodiments, each of the first race and the second race includes an axially extending end wall. In some embodiments, the end wall of the first race surrounds the face wall of the second race. In some embodiments, the face wall of the first race surrounds the end wall of the second race.

In some embodiments, the first race engages a first component of a transmission and the second race engages a second component of the transmission. The thrust bearing allows relative rotation of the first component and the second component about the axis of rotation. In some embodiments, the first component comprises a stationary component and the second component comprises a rotating component. In some embodiments, the first component comprises a stationary housing and the second component comprises a rotating gear. In some embodiments, the first component comprises a rotating component and the second component comprises a rotating component.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
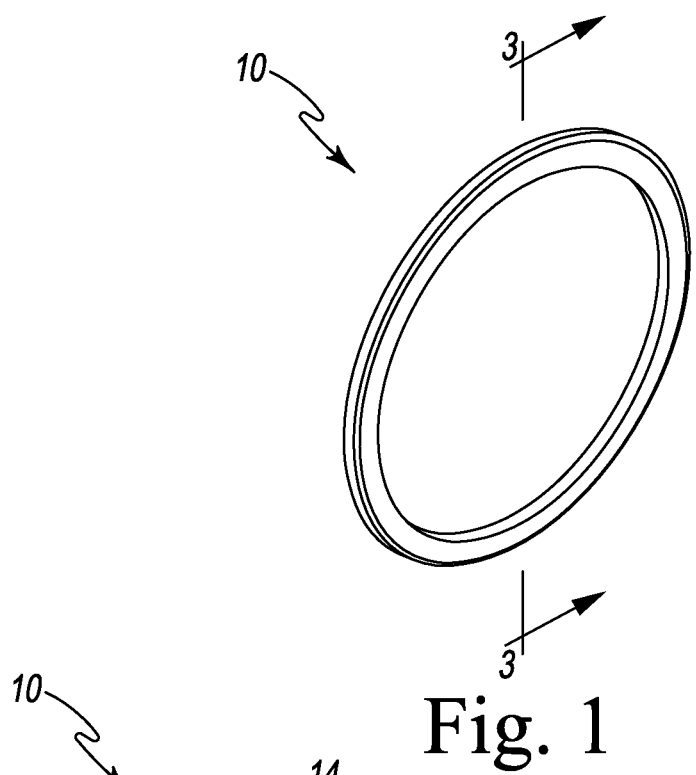
FIG. 1 is a perspective view of an embodiment of a thrust bearing in accordance with the present disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
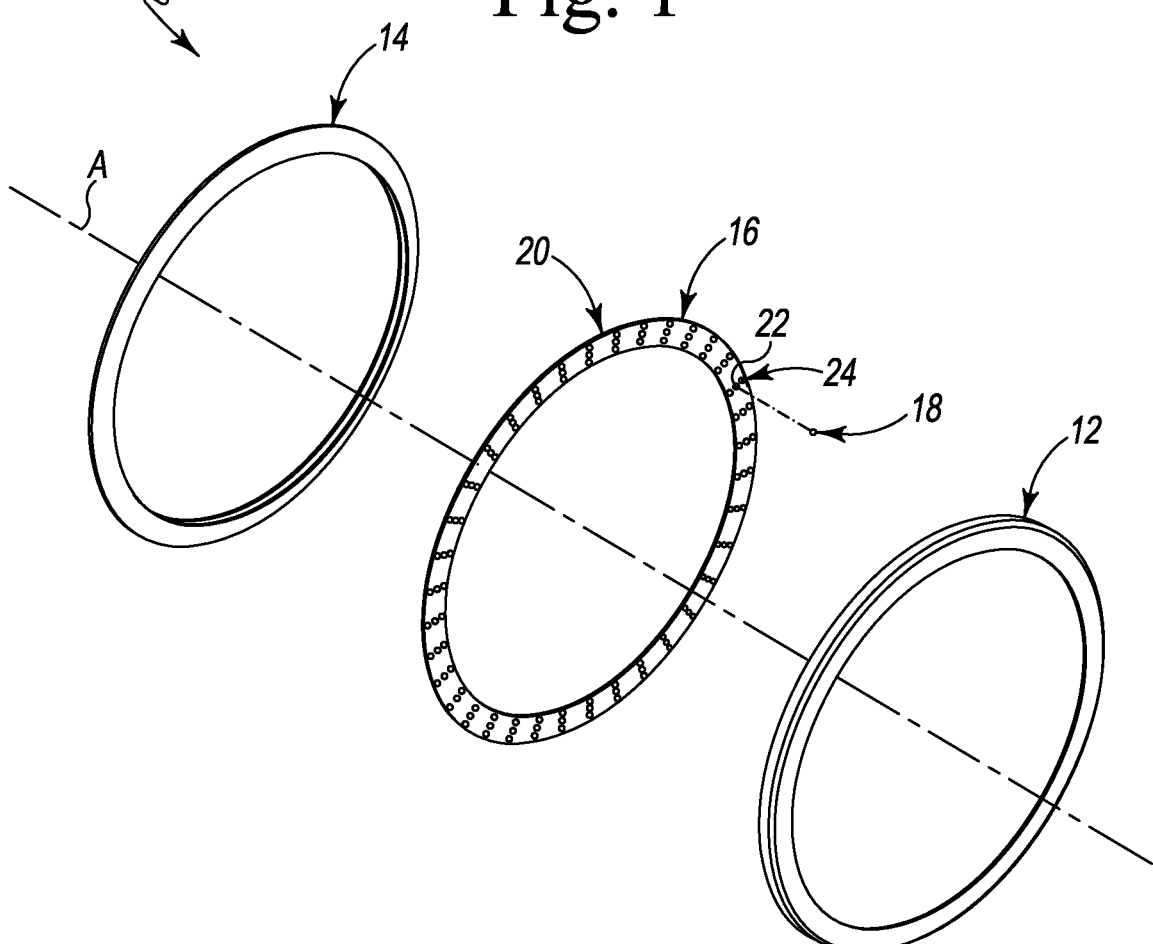
FIG. 2 is a partial exploded assembly view of the thrust bearing of FIG. 1 showing that inner and outer races extend around a cage arranged to orient a plurality of rolling elements relative to one another.

A thrust bearing 10 in accordance with the present disclosure is shown in FIGS. 1 and 2. The thrust bearing 10 includes an outer race 12, an inner race 14, a cage 16, and a plurality of rolling elements 18 (such as balls) as shown in FIG. 2. The cage 16 is positioned between the outer and inner races 12, 14 and configured to position the rolling elements 18 relative to one another. The rolling elements 18 allow the outer and inner races 12, 14 to rotate relative to one another about an axis of rotation A.

Figure 3:
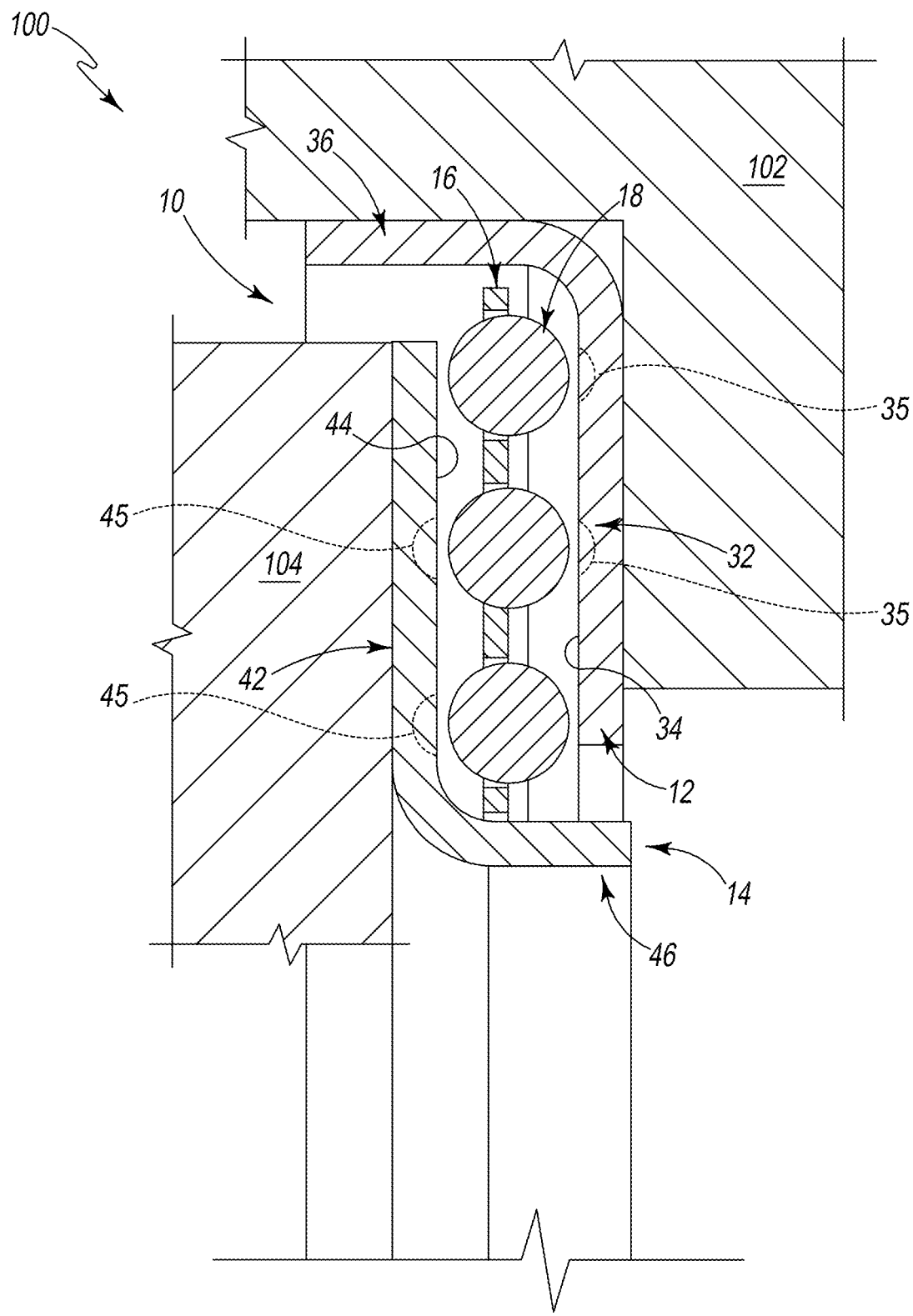
FIG. 3 is a sectional view taken along line 3-3 in FIG. 1 showing the thrust bearing arranged in an exemplary transmission to guide relative rotation of components in the transmission.
Figure 4:
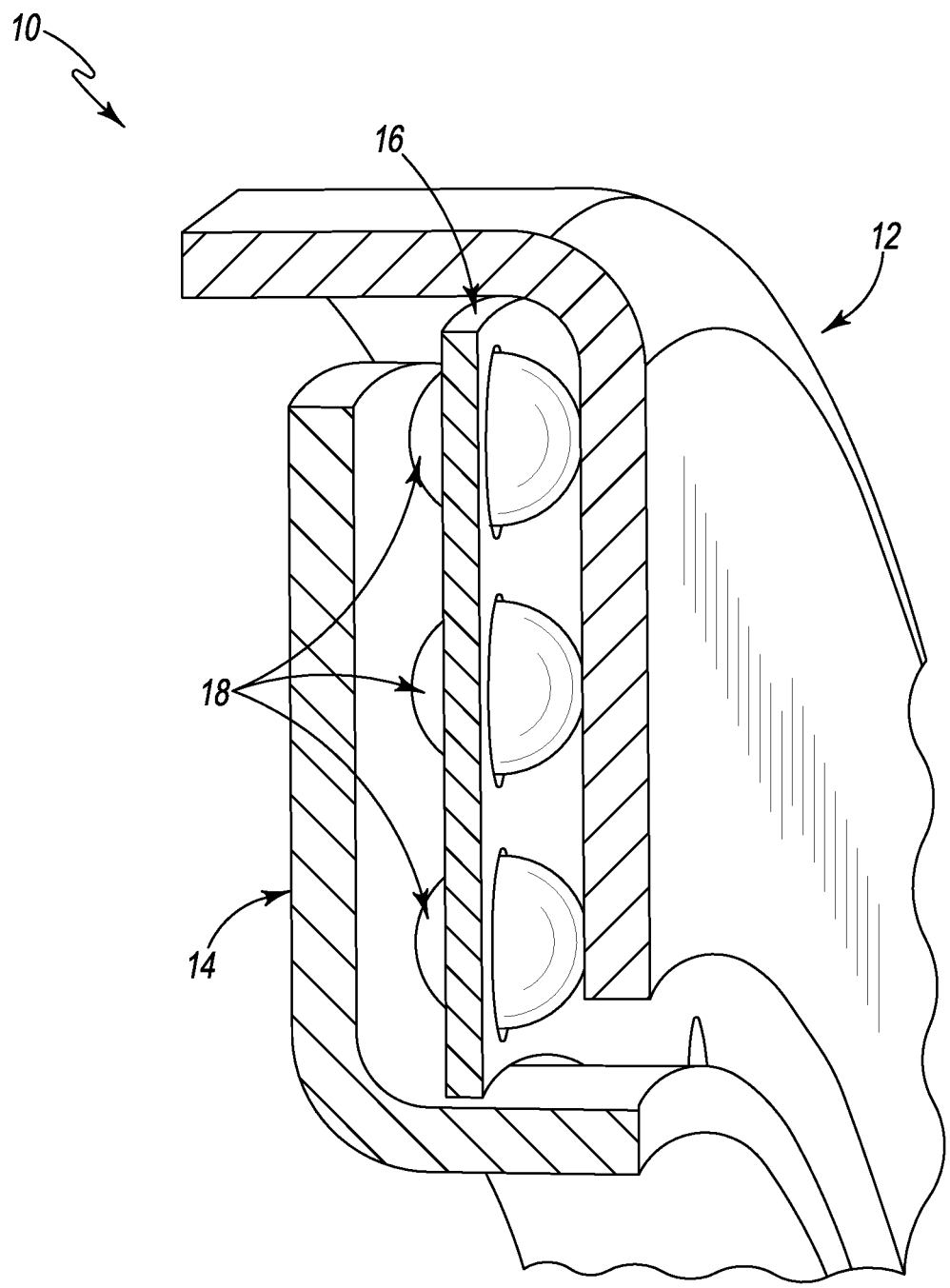
FIG. 4 is a perspective sectional view of the thrust bearing of FIG. 3.
Figure 5:
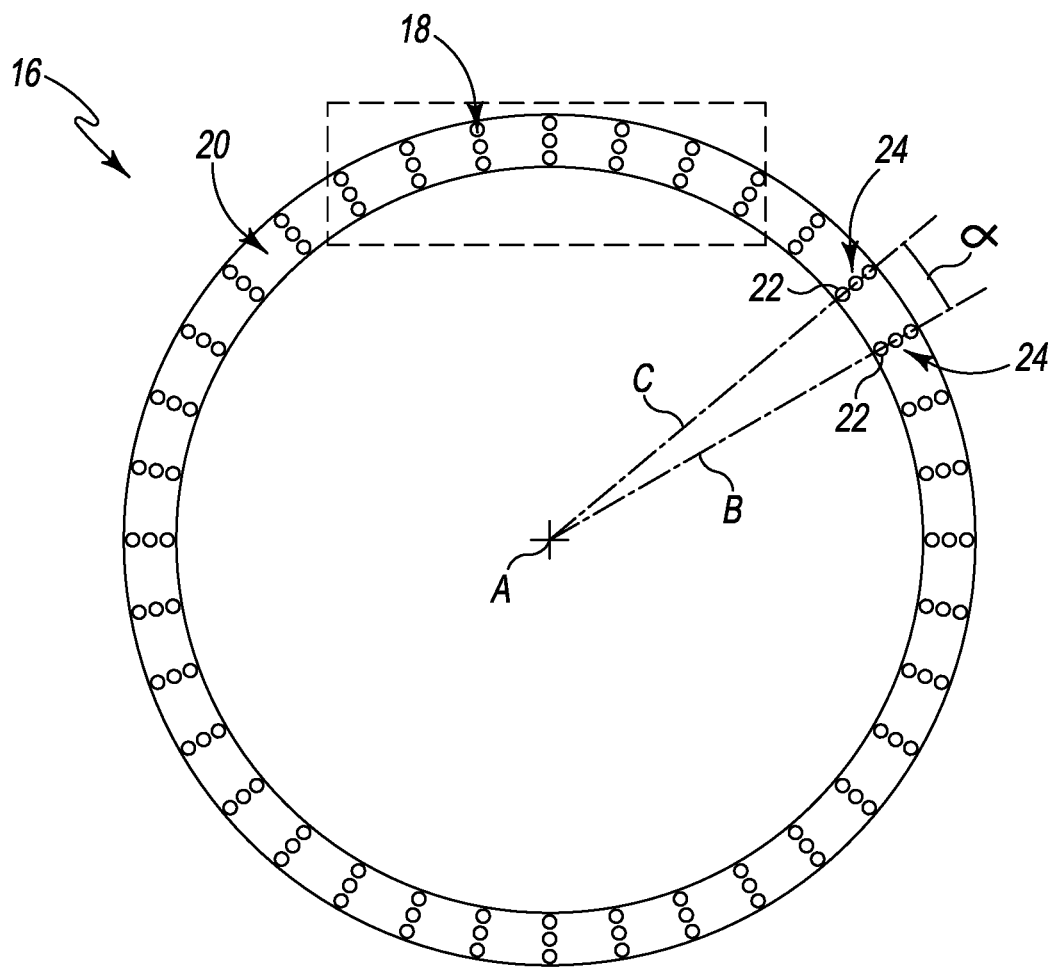
FIG. 5 is a front elevation view of the cage of FIG. 2 showing that the cage is formed to include openings for receiving the rolling elements and to position the rolling elements into circumferentially spaced apart rows.
Figure 6:
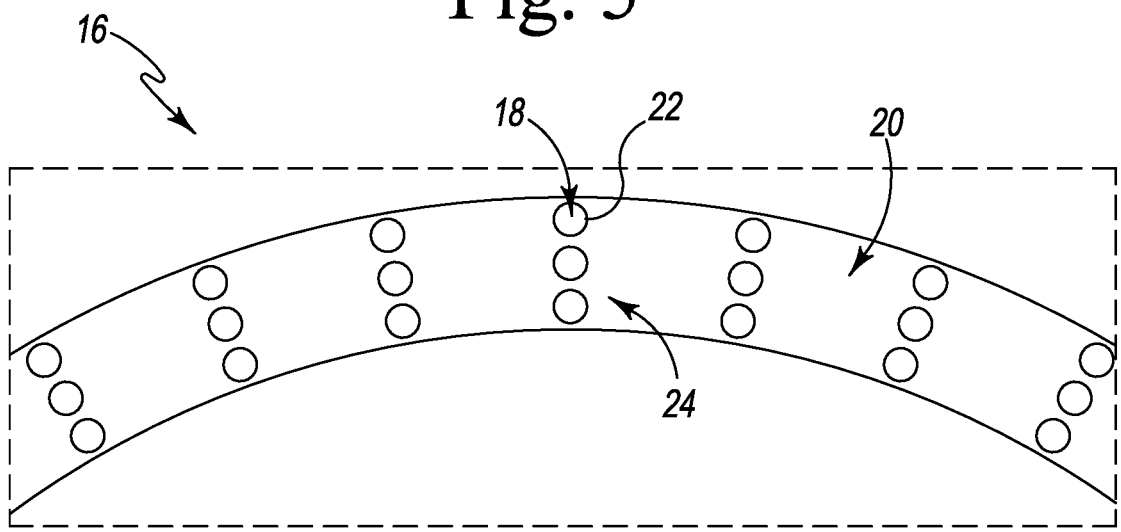
FIG. 6 is an enlarged view of the cage of FIG. 5 showing, in the exemplary embodiment, that each row includes three pockets and associated rolling elements.

The cage 16 includes a body 20 and a plurality of pockets 22 formed in the body 20 as shown in FIGS. 2-6. Each pocket 22 defines an opening through the body 20 that is sized to receive one or more of the rolling elements 18. The pockets 22 are arranged into rows 24 and configured to receive the rolling elements 18 for positioning the rolling elements 18 relative to one another. As shown in FIG. 5, a first row 24 is aligned along an axis B and a second row 24 is aligned along an axis C. The axes B, C extend through the axis A and are offset from one another by an angle α to circumferentially space the rows 24 apart from one another around the cage 16. In some embodiments, the angle α is about 10 degrees. In some embodiments, the angle α is from about 5 degrees to about 15 degrees. In some embodiments, the angle α can be adjusted to account for the available space on the cage 16 based on, for example, the inner and outer diameters of the cage 16, diameter of the rolling elements 18, number of rolling elements 18, number of rows 24, and number of pockets 22 in each row 24, among others variables. In some embodiments, the angle α can be adjusted to account for load and/or speed capacity requirements, with a higher load capacity leading to a lower angle α.

In the illustrative embodiment, each row 24 of the cage 16 includes three pockets 22 to receive three rolling elements 18 and position the rolling elements 18 into the row 24 as shown in FIGS. 2-6. The pockets 22 (sometimes called single-element pockets) in each row 24 are spaced apart from one another to space the rolling elements 18 apart from one another. In some embodiments, more than three pockets 22 are used in each row 24 to receive a corresponding number of rolling elements 18. In some embodiments, the number of pockets 22 in each row 24 can be adjusted to account for the available space on the cage 16 based on, for example, the inner and outer diameters of the cage 16, diameter of the rolling elements 18, number of rolling elements 18, number of rows 24, and spacing between each row 24 (e.g., angle α), among others variables.

The outer race 12 of the thrust bearing 10 includes a radially extending face wall 32 and an axially extending end wall 36 as shown in FIG. 3. The face wall 32 defines an interior surface 34 arranged to engage with the rolling elements 18. The inner race 14 includes a radially extending face wall 42 and an axially extending end wall 46. The face wall 42 defines an interior surface 44 arranged to engage with the rolling elements 18. The rolling elements 18 extend between the interior surfaces 34, 44 and allow relative rotation of the outer and inner races 12, 14 under load (e.g., where interior surfaces 34, 44 are forced toward one another). In some embodiments, one or more of the interior surfaces 34, 44 may be grooved to receive the rolling elements 18 as shown by groovs 35, 45 of FIG. 3. While a space is shown between rolling elements 18 and interior surfaces 32, 44 for ease of illustration, production units would have tighter tolerances.

In the illustrative embodiment, the rolling elements 18 are spherical balls as shown in FIGS. 2-4. The use of multiple rolling elements 18 in each row 24, such as three rolling elements 18, allows for increased distribution of load forces while minimizing rolling resistance. Some other bearings have limited numbers of rolling elements with lower load distribution and/or use cylindrical rollers that increase rolling resistance and/or sliding friction loss. The thrust bearing 10 of the present disclosure combines the advantages of a multi-row arrangement bearing (e.g., lower centrifugal force per rolling element, better speed-driven load distribution, and minimal rolling element sliding/lower heat generation) with ball rolling elements (e.g., point of contact, as opposed to line of contact, which increases overall efficiency).

The thrust bearing 10 can be used, for example, in a transmission 100 as shown in FIG. 3. In one exemplary embodiment, the outer race 12 engages with a first component 102 of the transmission 100, such as a stationary housing, and the inner race 14 engages with a second component 104 of the transmission 100, such as a rotating gear. Other configurations are contemplated by the present disclosure. For example, the inner race 14 can engage a stationary component and the outer race 12 can engage with a rotating component. In some embodiments, the thrust bearing 10 is engaged between two rotating components in the transmission 100. The thrust bearing 10 allows relative rotation of the components 102, 104 in the transmission 100 while transferring axial forces between the components 102, 104.

Figure 8:
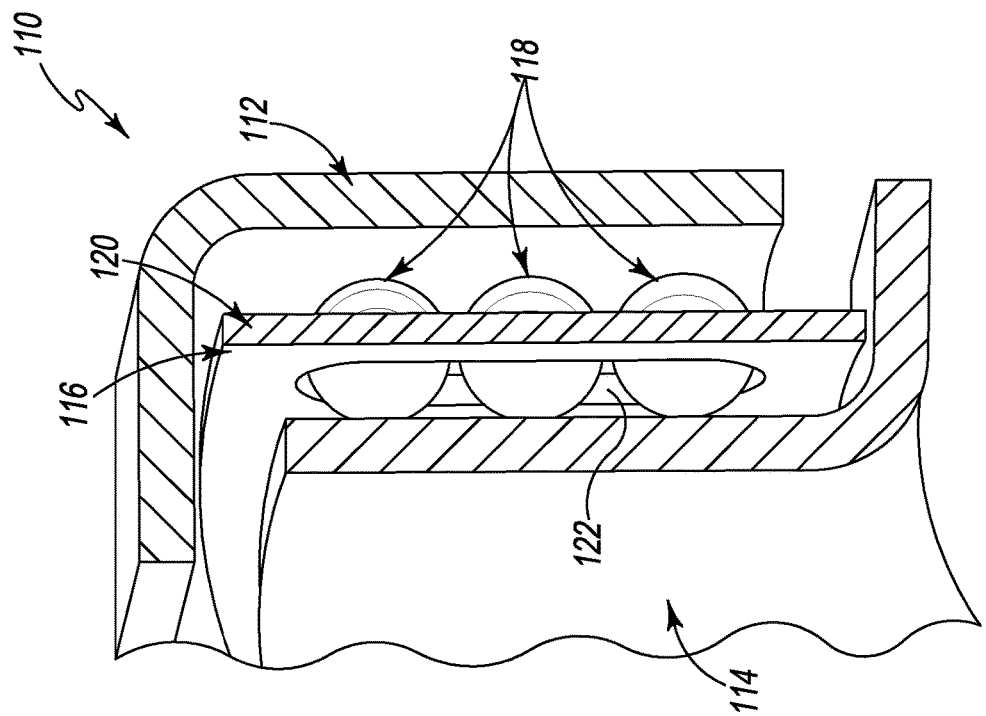
FIG. 8 is a perspective sectional view of the thrust bearing of FIG. 7 showing, in the exemplary embodiment, three rolling elements arranged in a row in a single pocket of the cage.
Figure 7:
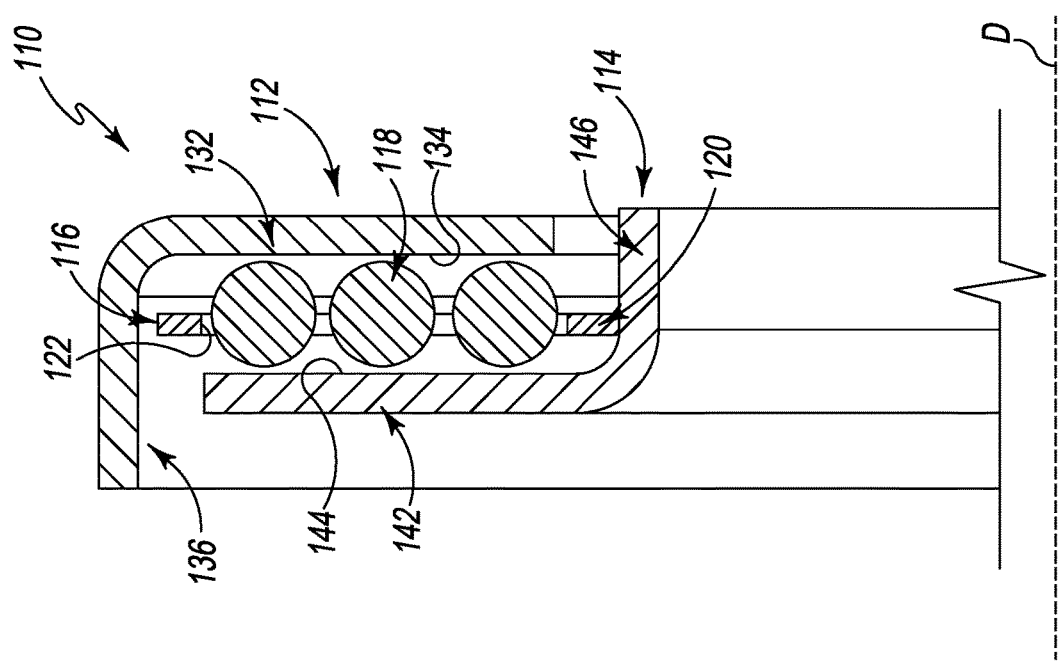
FIG. 7 is a sectional view of another embodiment of a thrust bearing in accordance with the present disclosure showing that the thrust bearing includes inner and outer races extending around a cage arranged to orient a plurality of rolling elements relative to one another.
Figure 9:
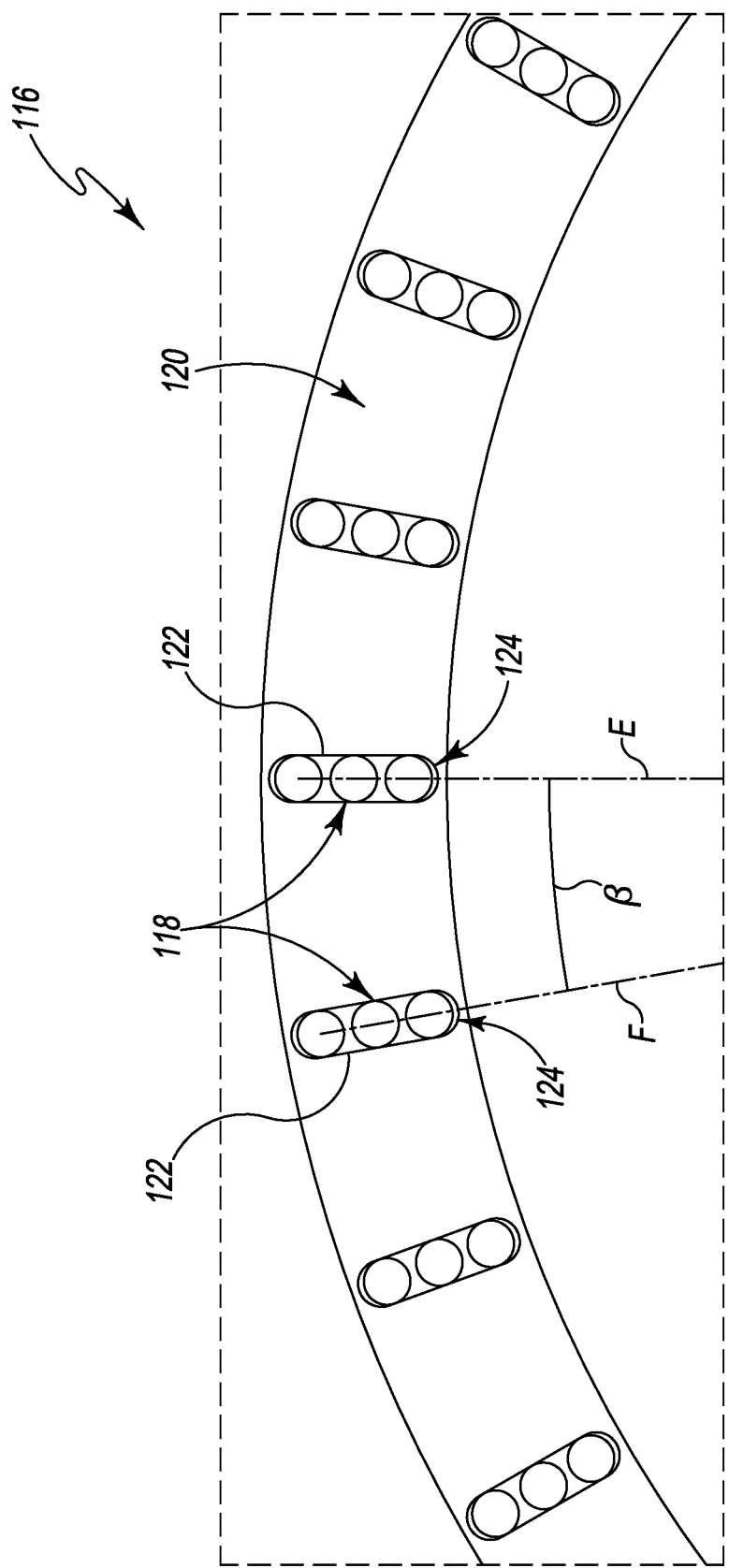
FIG. 9 is a partial front elevation view of the cage of FIG. 8 showing that the cage is formed to include a plurality of pockets for receiving the rolling elements and to position the rolling elements into circumferentially spaced apart rows.

Another embodiment of a thrust bearing 110 in accordance with the present disclosure is shown in FIGS. 7-9. The thrust bearing 110 is similar to the thrust bearing 10 of FIGS. 1-6, with the description of the thrust bearing 10 also applying to the thrust bearing 110 and vice versa. At least one difference between the thrust bearing 110 and the thrust bearing 10 is that pockets 122 in the thrust bearing 110 are configured to receive multiple rolling elements 118.

The thrust bearing 110 includes an outer race 112, an inner race 114, a cage 116, and a plurality of rolling elements 118 (such as balls) as shown in FIGS. 7-9. The cage 116 is positioned between the outer and inner races 112, 114 and configured to position the rolling elements 118 relative to one another. The rolling elements 118 allow the outer and inner races 112, 114 to rotate relative to one another about an axis of rotation D.

The cage 116 includes a body 120 and a plurality of pockets 122 formed in the body 120 as shown in FIGS. 7-9. Each pocket 122 defines an opening through the body 120 that is sized to receive multiple rolling elements 118. The pockets 122 are configured to receive the rolling elements 118 for positioning the rolling elements 118 relative to one another into rows 124. As shown in FIG. 9, a first row 124 is aligned along an axis E and a second row 124 is aligned along an axis F. The axes E, F extending through the axis D and are offset from one another by an angle $\beta$ to circumferentially space the rows 124 apart from one another around the cage 116. In some embodiments, the angle $\beta$ is about 10 degrees. In some embodiments, the angle $\beta$ is from about 5 degrees to about 15 degrees. In some embodiments, the angle $\beta$ can be adjusted to account for the available space on the cage 116 based on, for example, the inner and outer diameters of the cage 116, diameter of the rolling elements 118, number of rolling elements 118, number of rows 124, and number of pockets 122 in each row 124, among others variables. In some embodiments, the angle $\beta$ can be adjusted to account for load and/or speed capacity requirements, with a higher load capacity leading to a lower angle $\beta$.

In the illustrative embodiment, each pocket 122 (sometimes called multi-element pockets) of the cage 116 is configured to receive two or more (such as three) rolling elements 118 and position the rolling elements 118 into the row 124 as shown in FIGS. 7-9. In some embodiments, more than one pocket 122 is used in each row 124. In some embodiments, more than three rolling elements 118 are arranged in each of the rows 124. In some embodiments, the pockets 122 can be configured to receive more than three rolling elements 118. In some embodiments, the number and/or size of the pockets 122 in each row 124 can be adjusted to account for the available space on the cage 116 based on, for example, the inner and outer diameters of the cage 116, diameter of the rolling elements 118, number of rolling elements 118, number of rows 124, and spacing between each row 124 (e.g., angle $\beta$), among others variables.

The outer race 112 of the thrust bearing 110 includes a radially extending face wall 132 and an axially extending end wall 136 as shown in FIG. 7. The face wall 132 defines an interior surface 134 arranged to engage with the rolling elements 118. The inner race 114 includes a radially extending face wall 142 and an axially extending end wall 146. The face wall 142 defines an interior surface 144 arranged to engage with the rolling elements 118. The rolling elements 118 extend between the interior surfaces 134, 144 and allow relative rotation of the outer and inner races 112, 114 under load (e.g., where interior surfaces 134, 144 are forced toward one another). In some embodiments, one or more of the interior surfaces 134, 444 may be grooved to receive the rolling elements 118.

In some embodiments, various combinations of single-element and multi-element receiving pockets 22, 122 can be arranged into a row of a cage according to the present disclosure. Adjacent rows can also have different configurations of pockets and/or numbers of rolling elements. For example, a row may have a first pocket to receive one rolling element and a second pocket to receive two rolling elements. An adjacent row may have four pockets each receiving a single rolling element. The relative orientations of the pockets across adjacent rows can also be different. For example, one row may have a radially inner single-element pocket and a radially outer multi-element pocket while an adjacent row has a radially inner multi-element pocket and a radially outer single-element pocket. The spacing between rows, pockets, and/or rolling elements can be equal or varied. Other combinations and arrangements are contemplated by the present disclosure.

Figure 10:
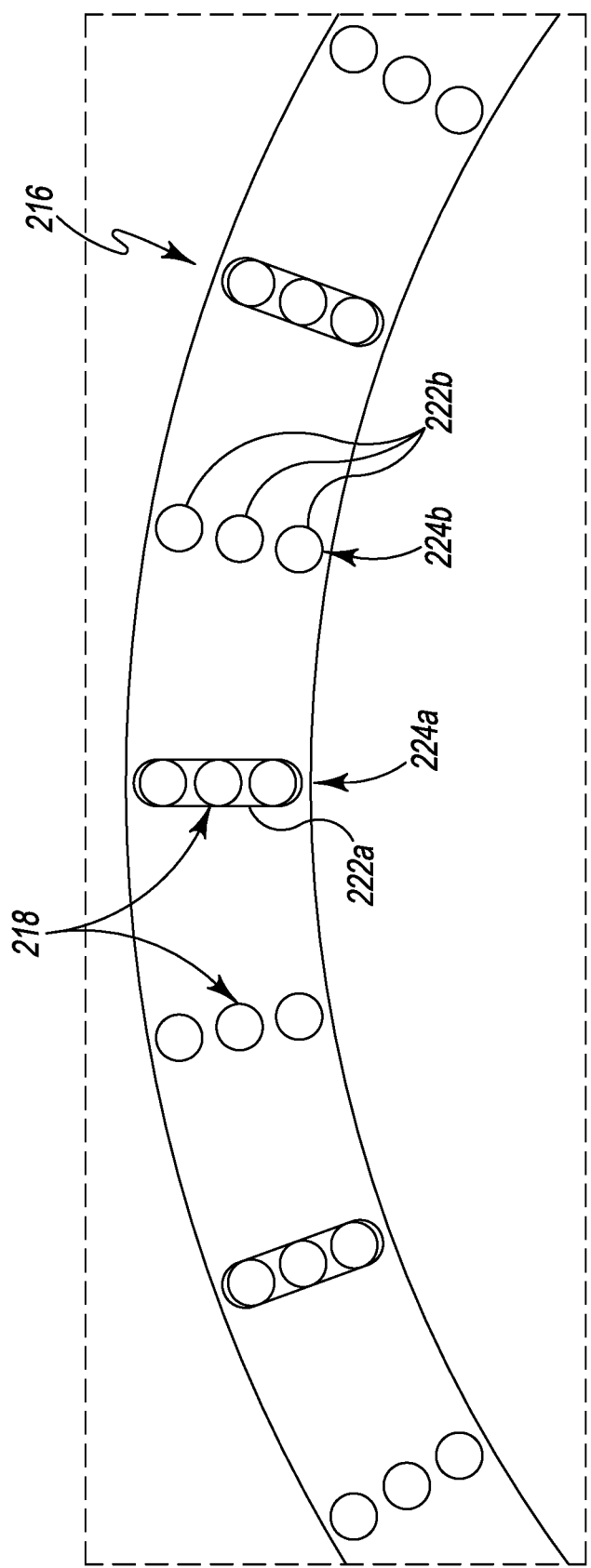
FIG. 10 is a front elevation view of another embodiment of a cage for use in a thrust bearing in accordance with the present disclosure.

Another embodiment of a cage 216 for use in a thrust bearing in accordance with the present disclosure is shown in FIG. 10. The cage 216 is similar to cages 16, 116, with at least one difference being that a first row 224a of balls 218 is arranged in an elongated pocket 222a, and an adjacent second row 224b has balls 218 arranged in individual pockets 222b. The balls 218 of each row 224a, 224b are aligned along axes extending through a central axis of rotation for the thrust bearing.

Figure 11:
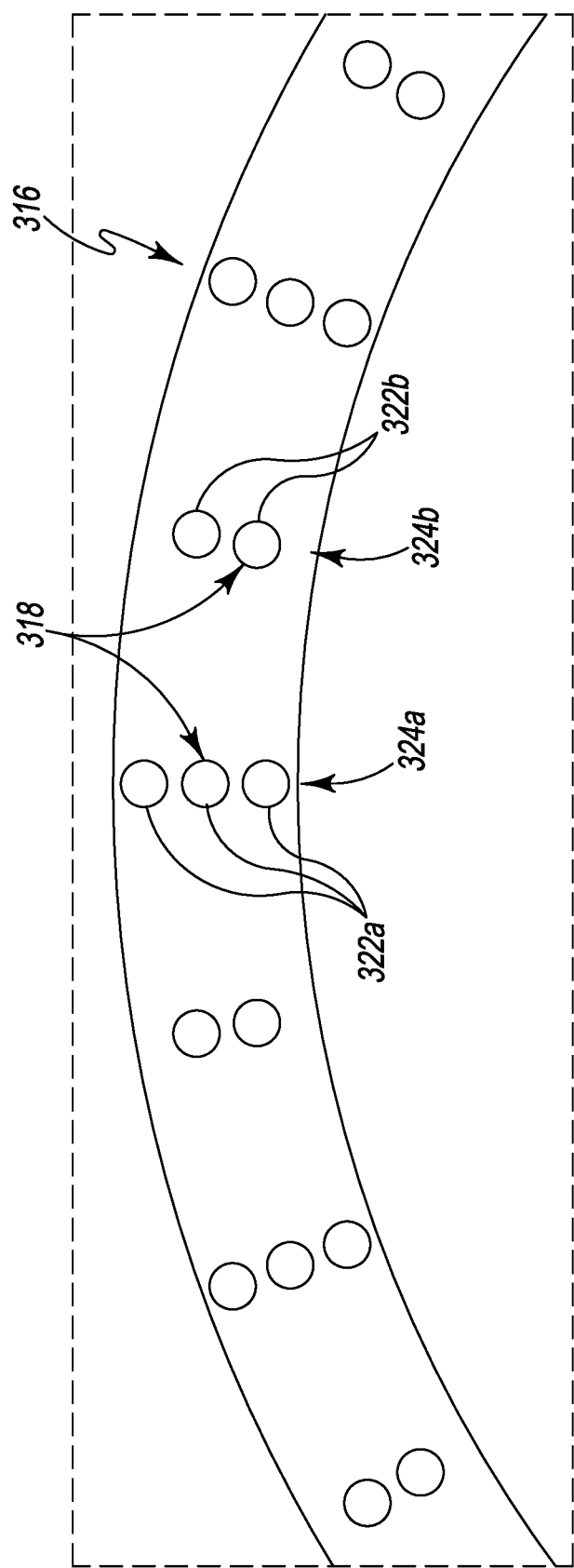
FIG. 11 is a front elevation view of another embodiment of a cage for use in a thrust bearing in accordance with the present disclosure.

Another embodiment of a cage 316 for use in a thrust bearing in accordance with the present disclosure is shown in FIG. 11. The cage 316 is similar to cages 16, 116, 216, with at least one difference being that a first row 324a includes three balls 318 arranged in pockets 322a, and an adjacent second row 324b includes two balls 318 arranged in pockets 322b. The balls 318 of each row 324a, 324b are aligned along axes extending through a central axis of rotation for the thrust bearing.

Figure 12:
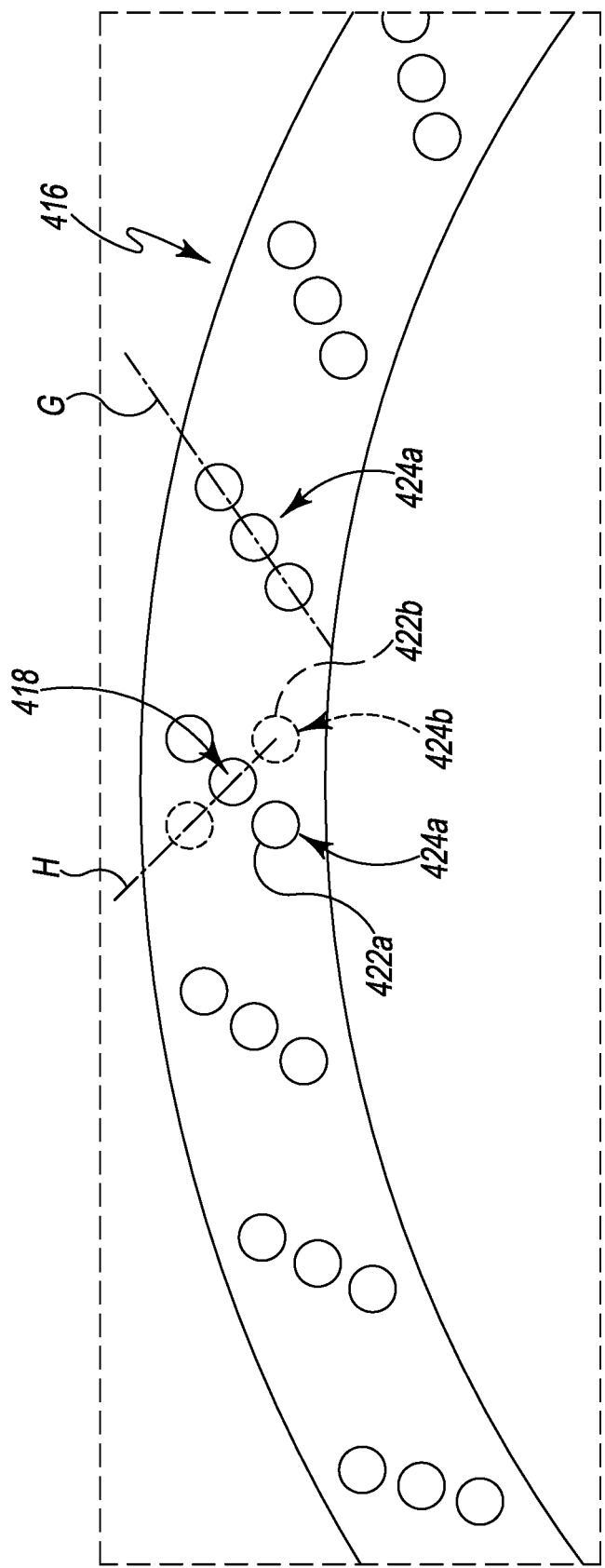
FIG. 12 is a front elevation view of another embodiment of a cage for use in a thrust bearing in accordance with the present disclosure.

Another embodiment of a cage 416 for use in a thrust bearing in accordance with the present disclosure is shown in FIG. 12. The cage 416 is similar to cages 16, 116, 216, 316, with at least one difference being that the cage 416 includes a plurality of rows 424a of balls 418 arranged in pockets 422a aligned along axes G offset from a central axis of rotation of the thrust bearing. In some embodiments, at least some of the balls 418 are arranged in pockets 422b of rows 424b aligned along axes H offset to an opposite side of the central axis of rotation for the thrust bearing from the axes G. In some embodiments, adjacent sets of balls 418 are arranged in alternating rows 424a, 424b. In some embodiments, the cage 416 includes a plurality of adjacent rows 424a and a plurality of adjacent rows 424b.

In illustrative embodiments, a thrust bearing includes rows of two or more balls mounted on a bearing cage. The cage and balls are arranged between two thrust washers (sometimes called races). The cage is used to maintain the balls spaced apart and kinematically independent from each other. The two thrust washers, which may be flat or grooved for ball contact, function as the bearing's inner and outer raceways. The cage may have independent pockets for each ball or a singular pocket for multiple balls.

A thrust bearing according to the present disclosure may provide improved efficiency compared to typical bearings, as contact area changes from a line (cylindrical rollers) to a point (ball rollers). Additionally, because contact area is effectively reduced from a line to a point of contact, the path of vibration may be reduced, thereby reducing noise. A thrust bearing of the present disclosure may also improve cage durability by distributing load among multiple balls, thereby avoiding the cage durability issues observed when cylinder roller bearings "drill" into cages due to centrifugal forces (e.g., at high speed). As a further advantage, a thrust bearing of the present disclosure may reduce heat and frictional losses, because by sectioning the rolling diameters into independent balls, the rolling elements can effectively move at different rolling speeds (i.e. independent from each other), which results in lower heat generation due to elimination of roller sliding. As yet another advantage, a thrust bearing of the present disclosure may exhibit reduced sensitivity to system misalignment of race surfaces as compared to cylindrical rollers. By using balls instead of cylinders, the bearing becomes less sensitive to radially continuous system misalignment.

The invention claimed is:

1. A thrust bearing comprising:
a first race;
a second race positioned opposite the first race, wherein the second race is arranged for rotation relative to the first race about an axis of rotation;
a plurality of rolling elements positioned between the first race and the second race; and
a cage positioned between the first race and the second race and configured to engage with the rolling elements to align the rolling elements into a plurality of rows, the rows circumferentially spaced apart from one another, wherein each row of rolling elements extends linearly along an axis of a plurality of axes, wherein each axis of the plurality of axes is offset from the axis of rotation;
wherein each row of rolling elements includes at least three rolling elements; and
wherein the cage includes a body and a plurality of pockets formed into the body, and wherein the pockets are configured to receive the rolling elements and engage with the rolling elements to align the rolling elements into the rows, and wherein each pocket defines an opening through the body of the cage that is sized to receive at least three rolling elements.

2. The thrust bearing of claim 1, wherein the rolling elements are spherical balls.

3. The thrust bearing of claim 1, wherein the cage and the plurality of rolling elements are positioned between radially extending face walls of the first race and the second race, and wherein the rolling elements are configured to engage with interior surfaces of the face walls to allow relative rotation of the first race and the second race.

4. The thrust bearing of claim 3, wherein the interior surfaces of the face walls are grooved to receive the rolling elements.

5. The thrust bearing of claim 3, wherein each of the first race and the second race includes an axially extending end wall.

6. The thrust bearing of claim 5, wherein the end wall of the first race surrounds the face wall of the second race.

7. The thrust bearing of claim 6, wherein the face wall of the first race surrounds the end wall of the second race.

8. A thrust bearing comprising:
a first race;
a second race positioned opposite the first race, wherein the second race is arranged for rotation relative to the first race about an axis of rotation;
a plurality of rolling elements positioned between the first race and the second race; and
a cage positioned between the first race and the second race and configured to engage with the rolling elements to align the rolling elements into a plurality of rows, the plurality of rows including a first plurality of rows that each extend linearly along a axis of a first plurality of axes, wherein each axis of the first plurality of axes is offset to a first side of the axis of rotation, and a second plurality of rows that each extend linearly along an axis of a second plurality of axes, wherein each axis of the second plurality of axes is offset to a second side of the axis of rotation, wherein the second side is opposite the first side;
wherein each row of rolling elements includes at least three rolling elements; and
wherein the cage includes a body and a plurality of pockets formed into the body, and wherein the pockets are configured to receive the rolling elements and engage with the rolling elements to align the rolling elements into the rows, and wherein each pocket defines an opening through the body of the cage that is sized to receive at least three rolling elements.

9. The thrust bearing of claim 8, wherein the rolling elements are spherical balls.

10. The thrust bearing of claim 8, wherein an axis of the first plurality of axes intersects an axis of the second plurality of axes at a 90-degree angle.

11. The thrust bearing of claim 8, wherein each of the first plurality of rows is positioned circumferentially adjacent to a row of the second plurality of rows.

12. The thrust bearing of claim 8, wherein the cage and the plurality of rolling elements are positioned between radially extending face walls of the first race and the second race, and wherein the rolling elements are configured to engage with interior surfaces of the face walls to allow relative rotation of the first race and the second race.

13. The thrust bearing of claim 12, wherein the interior surfaces of the face walls are grooved to receive the rolling elements.

14. The thrust bearing of claim 12, wherein each of the first race and the second race includes an axially extending end wall.

15. The thrust bearing of claim 14, wherein the end wall of the first race surrounds the face wall of the second race.

16. The thrust bearing of claim 15, wherein the face wall of the first race surrounds the end wall of the second race.

\* \* \* \* \*